(12) United States Patent
Nelson et al.

(10) Patent No.: US 8,689,825 B2
(45) Date of Patent: Apr. 8, 2014

(54) FLOW CONTROL VALVE

(75) Inventors: Peter James Nelson, Killara (AU); John Robert De Wit, McDowall (AU); Theodore Aaron Steinberg, Mount Crosby (AU)

(73) Assignee: Oxycheck Pty Ltd (AU)

( * ) Notice: Subject to any disclaimer, the term of this patent is extended or adjusted under 35 U.S.C. 154(b) by 501 days.

(21) Appl. No.: 12/446,228

(22) PCT Filed: Oct. 17, 2007

(86) PCT No.: PCT/AU2007/001583
§ 371 (c)(1),
(2), (4) Date: May 11, 2009

(87) PCT Pub. No.: WO2008/046150
PCT Pub. Date: Apr. 24, 2008

(65) Prior Publication Data
US 2010/0051118 A1     Mar. 4, 2010

(30) Foreign Application Priority Data

Oct. 17, 2006   (AU) ............................ 2006905765

(51) Int. Cl.
*F16K 15/04*      (2006.01)
(52) U.S. Cl.
USPC .................. 137/539.5; 137/539; 251/368
(58) Field of Classification Search
USPC .................. 137/539, 539.5; 251/368
See application file for complete search history.

(56) References Cited

U.S. PATENT DOCUMENTS

| | | | | |
|---|---|---|---|---|
| 1,469,106 A | * | 9/1923 | Phillips, Sr. | 417/549 |
| 2,322,139 A | * | 6/1943 | Kaelin | 137/515.3 |
| 2,470,372 A | * | 5/1949 | Roth | 137/539.5 |
| 3,286,726 A | * | 11/1966 | Guy | 137/505.18 |
| 3,363,580 A | * | 1/1968 | Logue | 417/480 |
| 4,080,800 A | | 3/1978 | Spaulding et al. | |
| 4,091,839 A | | 5/1978 | Donner | |
| 4,112,959 A | | 9/1978 | Jaekel | |
| 4,282,897 A | * | 8/1981 | de Mey, II | 137/515.7 |

(Continued)

FOREIGN PATENT DOCUMENTS

| | | | | |
|---|---|---|---|---|
| FR | 2773822 | * | 7/1999 | C25B 1/04 |
| GB | 1391887 | | 4/1975 | |
| JP | 405317757 A | * | 12/1993 | B05B 1/32 |
| WO | 9816766 A1 | | 4/1998 | |

OTHER PUBLICATIONS

Translation of Detailed Description of JP405317757A Published Dec. 3, 1993.*
Abstract of JP405317757A Published Dec. 3, 1993.*

(Continued)

*Primary Examiner* — Kevin Lee
*Assistant Examiner* — Macade Brown
(74) *Attorney, Agent, or Firm* — Hayes Soloway P.C.

(57) ABSTRACT

A flow control valve for use in oxygen systems. The flow control valve has a body within an inlet and an outlet. A seat is located within the body and a ball retainer is located within the body. The ball retainer is able to capture a ball. The flow control valve also has biasing means connected to the ball retainer. Furthermore, the biasing means is movable between a flow and a non-flow position. The ball retainer is in a closed position when the ball, captured by the ball retainer, engages the seat to prevent gas flowing through the seat.

28 Claims, 5 Drawing Sheets

(56) References Cited

U.S. PATENT DOCUMENTS

| | | | | |
|---|---|---|---|---|
| 4,395,589 A | * | 7/1983 | Williams | 381/386 |
| 4,465,951 A | * | 8/1984 | Dalby | 310/114 |
| 4,590,962 A | * | 5/1986 | Tespa | 137/498 |
| 4,698,940 A | | 10/1987 | Zwicker | |
| 4,700,741 A | | 10/1987 | Murphy | |
| 4,932,434 A | * | 6/1990 | Taylor | 137/469 |
| 5,190,362 A | * | 3/1993 | Schaefer et al. | 303/113.2 |
| 5,364,325 A | * | 11/1994 | Matthews | 482/111 |
| 5,636,794 A | * | 6/1997 | Hess et al. | 239/284.1 |
| 2005/0217730 A1 | | 10/2005 | Doutt | |

OTHER PUBLICATIONS

PCT/US07/01583, Written Opinion of the International Searching Authority, Nov. 23, 2007.

* cited by examiner

FLOW CONTROL VALVE

FIELD OF THE INVENTION

THIS INVENTION relates to a flow control valve. In particular, the invention relates to a flow control valve for use in oxygen-enriched environments and will therefore be described in this context. Oxygen-enriched environments include, but are not limited to, systems using low and high-pressure pure oxygen, high-pressure air and oxygen/nitrogen mixes with higher oxygen concentrations than standard temperature and pressure breathing air. However, it will be appreciated that the flow control valve may be used for other applications.

BACKGROUND OF THE INVENTION

Oxygen and high-pressure air valves are used in many applications including oxygen tanks, SCUBA systems, filling stations, space capsules, in-home liquid oxygen tank systems, fuel pipe oxygen systems, aeroplane pilots' breathing apparatus, hospital breathing apparatus, steel, chemical and cold gasification plants, oxygen powered engines or any other associated processes. If oxygen is not properly controlled or used with equipment not specifically designed for oxygen, then accidents resulting in system failure and/or loss of plant, severe injury and death may occur.

Oxygen is an oxidising gas that vigorously supports burning. As a result, almost all materials are flammable and will burn actively at high temperatures in the presence of oxygen. Some materials which do not burn in air, will readily burn in oxygen-enriched atmospheres. In extreme cases, some materials may spontaneously burn in an oxygen-enriched environment if any heat generating mechanism is present and, if the concentration of this oxygen is sufficiently high, the burning of these materials may propagate to adjacent materials and devices.

Contaminants in oxygen systems are especially prone to ignite adjacent metallic and non-metallic materials and therefore greatly increase the potential for fire. When gas is compressed quickly inside a closed system such as a container or piping or a valve, the temperatures of the gas and adjacent materials can rise sharply. In an oxygen system, this rise in temperature can be high enough to cause ignition of contaminants such as oil, grease, solvents and materials such as dust, lint, metal chips, many organic and most non-metallic materials. Oxygen flowing at high speed through a valve or piping systems can also propel contaminants or particles with such force that friction or impact between the particles and/or system components can raise the temperature to ignition point of the contaminants, particles, or metallic system components, resulting in a major incident. It should also be appreciated that other ignition mechanisms are recognised to be present in these systems such as gas flow friction, mechanical friction, mechanical impact, electrical spikes and lightning strikes.

Ideally, cylinders, piping valves regulators, flame eaters and all other devices used in these systems will be constructed of non-flammable materials such as gold, silver (noble materials) and oxide ceramics. However, due to economic constraints and in order to achieve a non-leaking oxygen system, resilient sealing materials typically made of plastics, synthetic rubbers or some soft metals are often used. Unfortunately, these materials are less resistant to ignition than other metallic materials. Accordingly, materials with more favorable ignition and burning characteristics often result in leakages.

OBJECT OF THE INVENTION

It is an objection of the invention to overcome or alleviate one or more of the above disadvantages or provide the consumer with a useful commercial choice.

SUMMARY OF THE INVENTION

In one form, although not necessarily the only or broadest form, the invention resides in a flow control valve for use in oxygen systems, the flow control valve comprising:
  a body having an inlet and an outlet;
  a seat located within the body;
  a ball retainer located within the body and able to capture a ball,
  a biasing means connected to the ball retainer, the biasing means movable between a flow and a non-flow position;
  wherein the ball retainer is in its closed position when the ball, captured by the ball retainer, engages the seat to prevent gas flowing through the seat.

A seat retainer may be used to hold the seat in a desired position.

Preferably at least the body, seat, ball retainer and biasing member are all made from a nickel based alloy or copper based alloy. Typically, brass is the copper based alloy. Preferably, UNS C38500 brass is used to manufacture at least the seat.

Preferably the threshold pressure of the materials that the body, seat, ball retainer and spring retainer are made of is greater than 25 MPA. More preferably, the threshold pressure of the materials is greater than 40 MPA. The threshold pressure is defined in ASTM (American Society for Testing and Materials) G 124 Standard Test Method for "Determining the Combustion Behaviour of Metallic Materials in Oxygen-Enriched Atmospheres".

Preferably the ball is made from corundum.

The ball is typically made from aluminium oxide such as a ceramic or synthetic sapphire. However, it is envisaged that other metallics, oxides or other hard materials may be used and may be produced through various other process.

Preferably the hardness of the ball is preferably above 7 on Mohs hardness scale. More preferably, the hardness of the ball is preferably above 8 on Mohs hardness scale. Most preferably, the hardness of the ball is preferably above 9 on Mohs hardness scale.

Preferably, the surface finish is better than AFBMA (Anti-Friction Bearing Manufacturers Association) Grade 200. More preferably, the surface finish is better than AFBMA Grade 100. Most preferably, the surface finish is better than AFBMA Grade 50.

The biasing means is typically a spring. Normally the spring is a helical spring. Preferably the spring is made from wire that has a gauge of less than 3 millimeters. More preferably the spring is made from wire that has a gauge of less than 2 millimeters. Most preferably, the spring is made from wire that has a gauge of less than 1 millimeters. The spring may be fully compressed when the valve is opened.

Preferably, the spring prevents the ball retainer from moving more than 3 millimeters. More preferably, the spring prevents the ball retainer from moving more than 1 millimeters. Most preferably, the spring prevents the ball retainer from moving more than 0.5 millimeters.

A spring retainer may be used to hold and/or guide the spring within the body.

A lock device may be used to hold the spring retainer in a desired position within the body.

A filter may be located within the body. The filter may be located adjacent the seat.

An internal passageway of the body may by threaded. Accordingly, the seat retainer, spring retainer and lock device may all be also threaded. Engagement of the threads between the internal passageway of the body and the external threads of the seat retainer, spring retainer and lock device may be used to locate the seat retainer, spring retainer and lock device in their desired locations.

Preferably, the valve has a cracking pressure of less than 50 psi. More preferably, the valve has a cracking pressure of less than 40 psi. Most preferably, the valve has a cracking pressure of less than 30 psi.

BRIEF DESCRIPTION OF THE DRAWINGS

An embodiment of the invention will be described with reference to the accompanying drawings in which:

FIG. 3 shows a perspective view of a filter;

DETAILED DESCRIPTION OF THE PREFERRED EMBODIMENT

Figure 1:
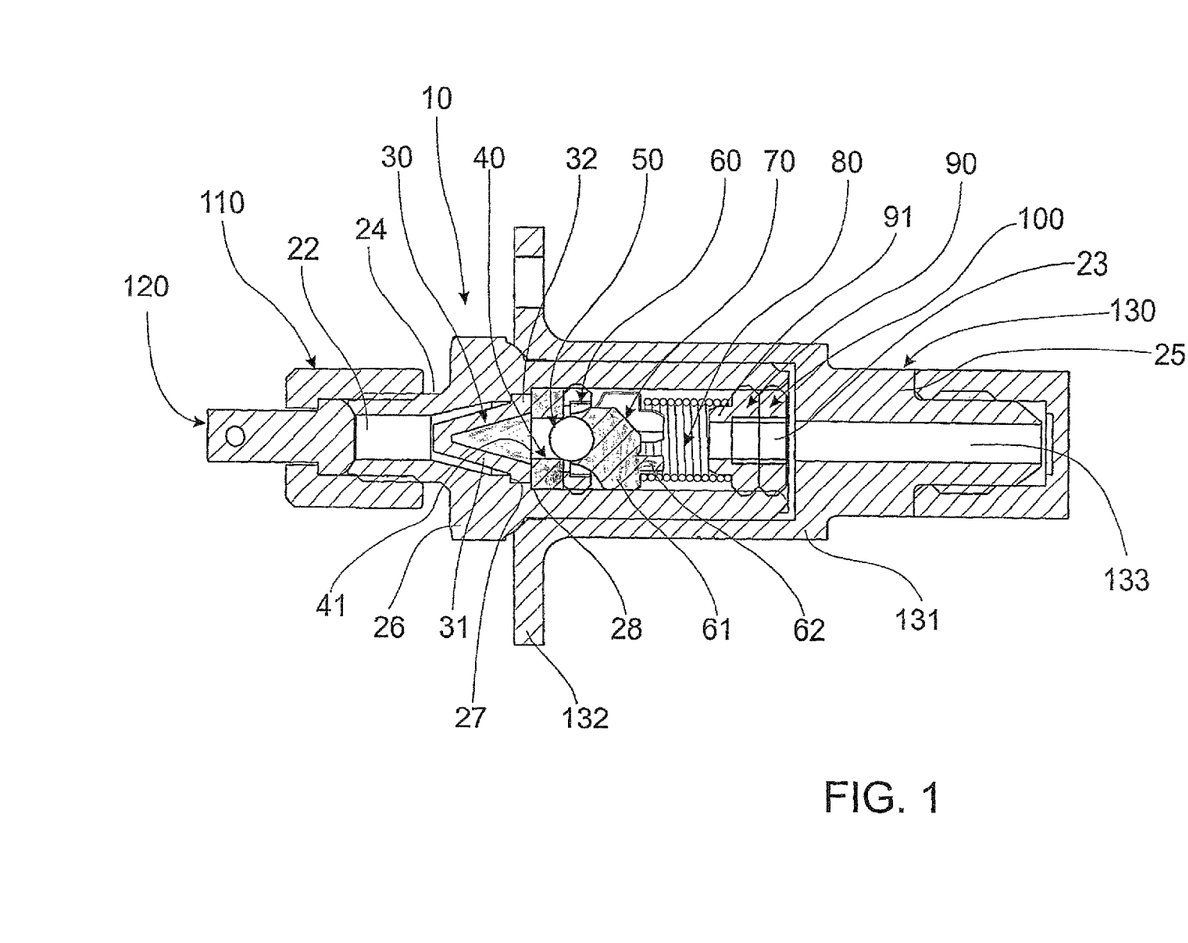
FIG. 1 shows a side sectional view of a flow control valve according to the embodiment of the invention.
Figure 14:
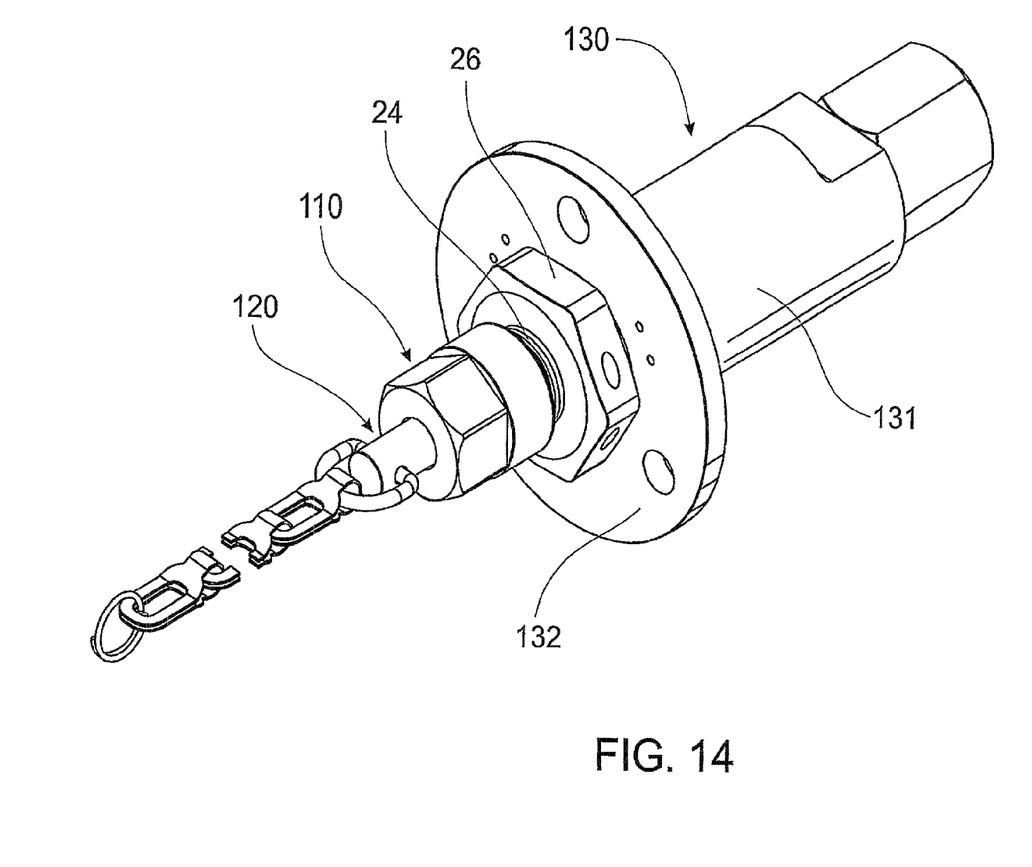
FIG. 14 shows a perspective view of the flow control valve of FIG. 1.
Figure 15:
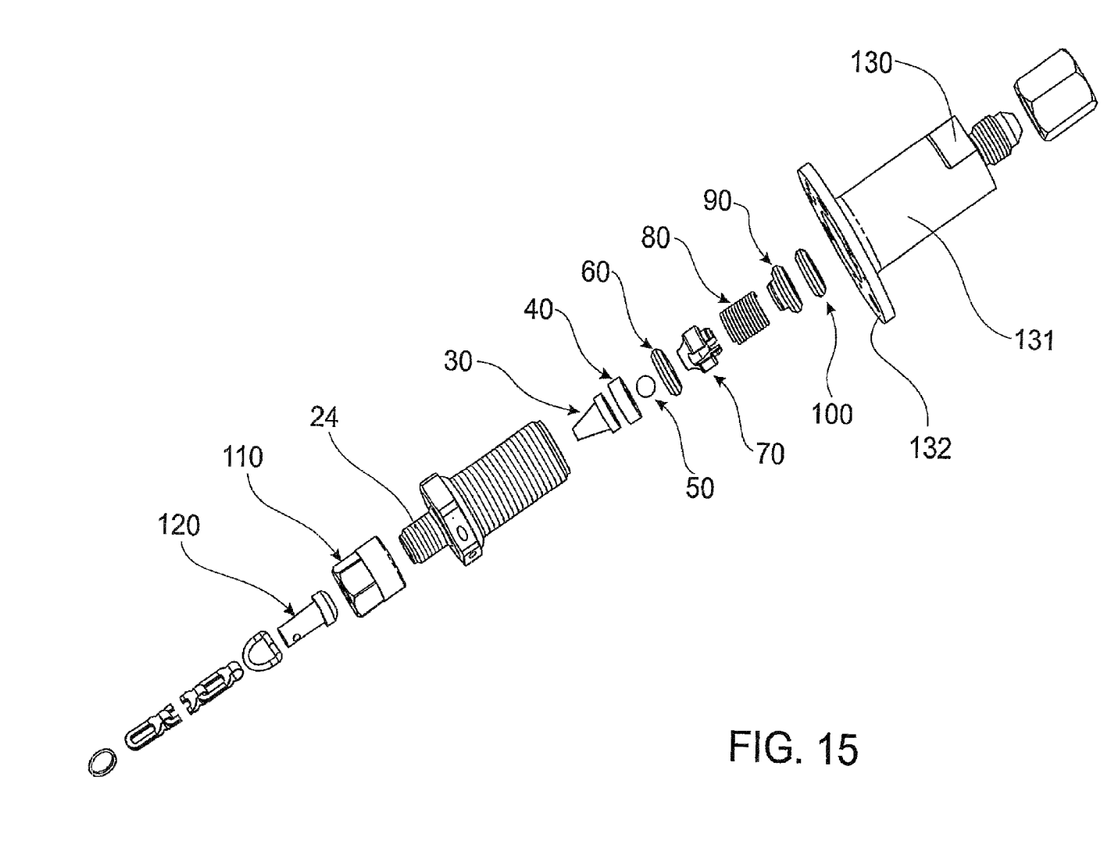
FIG. 15 shows an exploded perspective view of the flow control valve of FIG. 1.

FIGS. 1, 14 and 15 shows a flow control valve 10 for use in a high pressure oxygen system. In particular, the flow control valve 10 shown in FIGS. 1, 14 and 15 is for use with aircraft so that oxygen cylinders that are carried within the aircraft can be filled quickly, easily and safely. The flow control valve 10 includes a valve body 20, filter 30, seat 40, ball 50, seat retainer 60, ball retainer 70, spring 80, spring retainer 90, lock device 100, dust cap 110, dust cap plug 120 and housing 130.

Figures 2, 4, 5, 6, 7, 8, 9, 10, 11, 12:
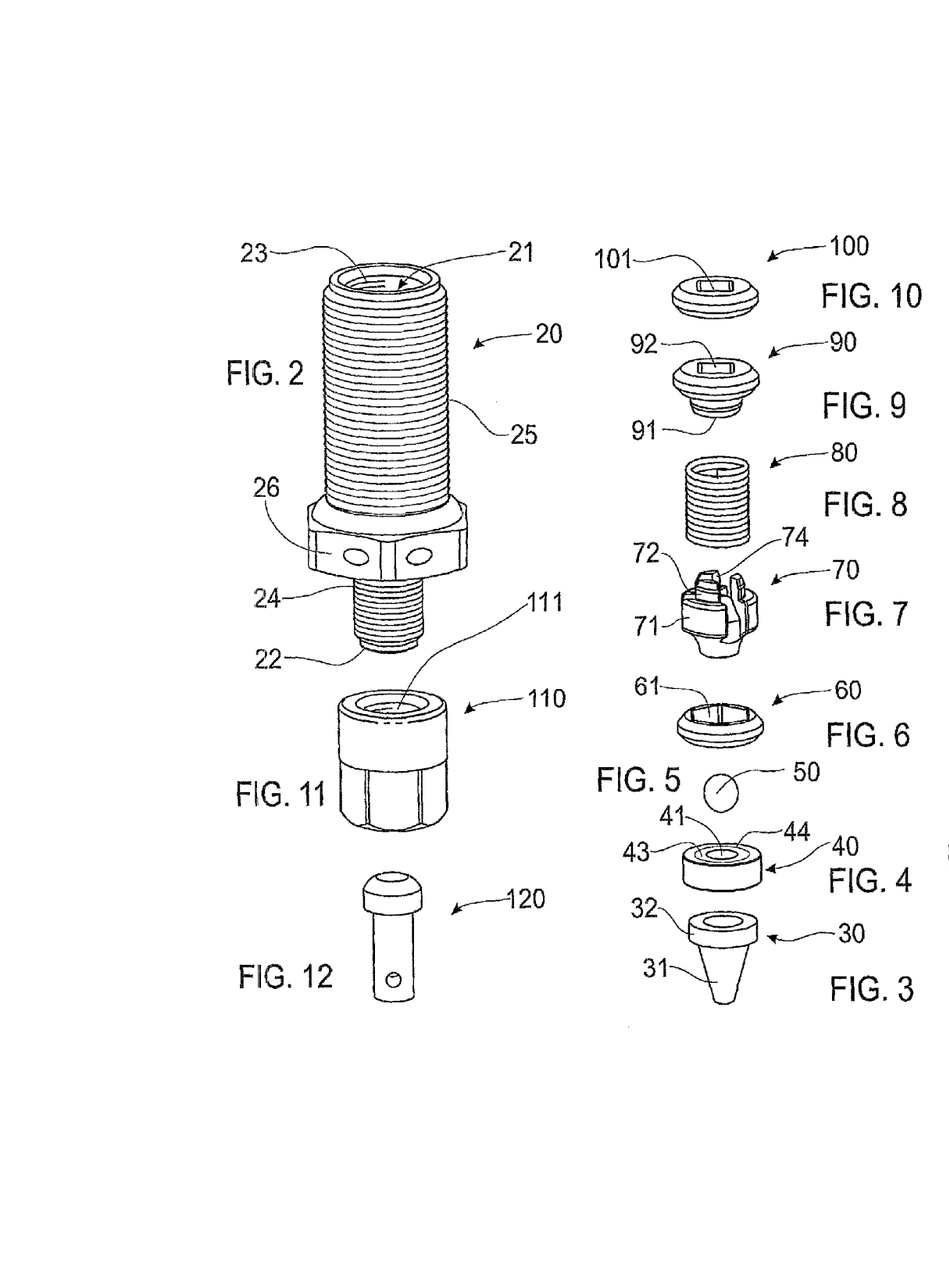
FIG. 2 shows a perspective view of a flow control valve body.
FIG. 4 shows a perspective view of a seat.
FIG. 5 shows a perspective view of a ball.
FIG. 6 shows a perspective view of a seat retainer.
FIG. 7 shows a perspective view of a ball retainer.
FIG. 8 shows a perspective view of a spring.
FIG. 9 shows a perspective view of a spring retainer.
FIG. 10 shows a perspective view of a lock device.
FIG. 11 shows a perspective view of a dust cap.
FIG. 12 shows a perspective view of a dust cap plug.

The valve body 20, shown in FIG. 2, has a central passageway 21 that allows oxygen to flow from an inlet 22 to an outlet 23 through the valve body 20. An inlet stem 24 is located adjacent the inlet 22 whilst an outlet stem 25 is located adjacent the outlet 23. A hexagonal head 26 separates the inlet stem 24 from the outlet stem 25. Both the inlet stem 24 and outlet stem 25 have an external thread. The outlet stem 25 also has an internal thread that extends along the passageway 23. A lip 27 and a support 28 are located within the passageway 23.

Figures 3A, 4A, 6A, 7A:
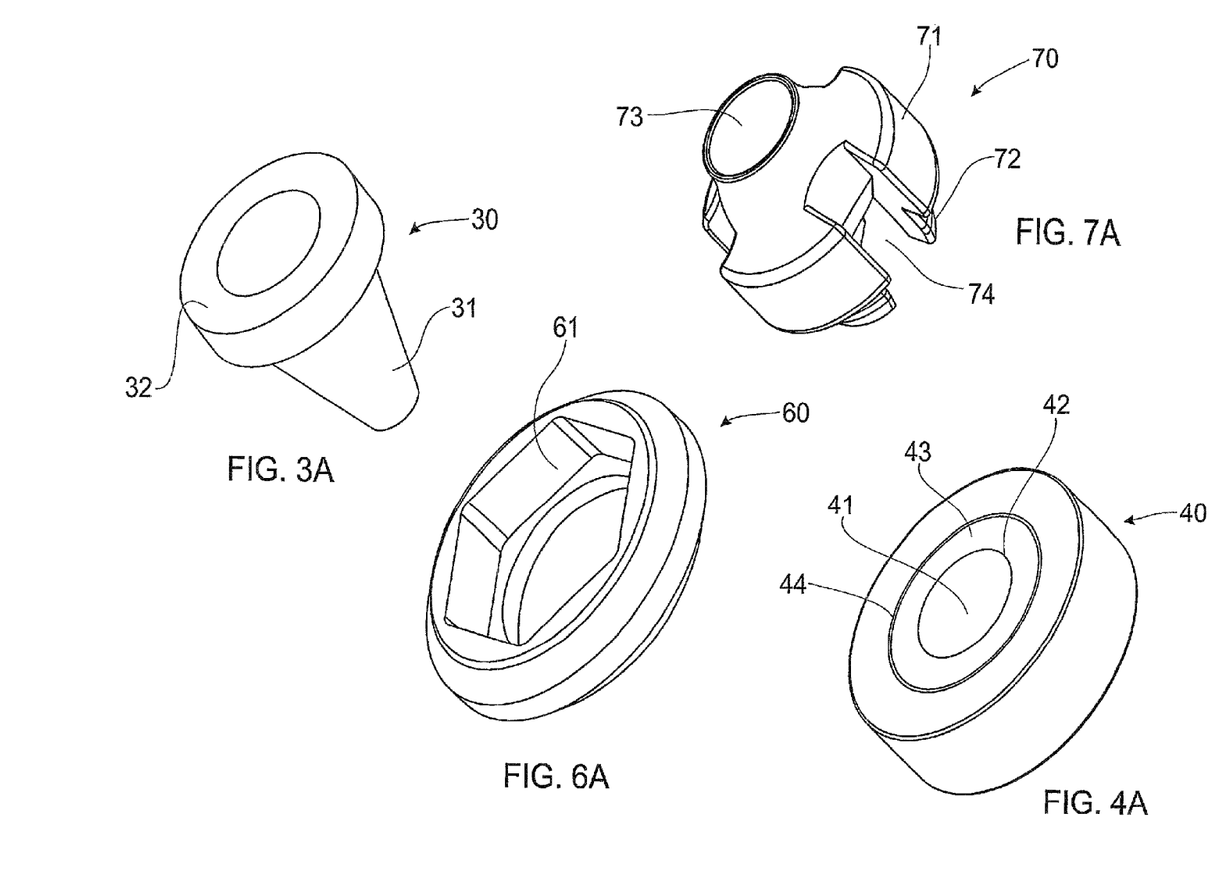
FIG. 3A shows a further perspective view of the filter at FIG. 3.
FIG. 4A shows a further perspective view of the seat at FIG. 4.
FIG. 6A shows a further perspective view of the seat retainer at FIG. 6.
FIG. 7A shows a further perspective view of the ball retainer at FIG. 7.

The filter 30 is shown in more detail in FIG. 3 and FIG. 3A. The filter 30 is made from sintered bronze and has a conical section 31 having a depending skirt 32. The filter 30 filters any impurities located within the oxygen that flows through the passageway 23.

The seat 40 shown in FIG. 4 and FIG. 4A is made from brass and is substantially cylindrical in shape. A hole 41 extends through the seat 40 with a face 42 of the hole 41 being substantially perpendicular with the front face 43 of the seat 40. A groove 44 is located on one side of the seat 40 to ensure the correct placement of the seat 40 within the valve body 20.

FIG. 5 shows a ball 50 that is made from an alumina (aluminium oxide) that is formed into a synthetic sapphire (corundum). The surface finish of the ball 50 is very high and has a AFBMA grade of better than 100 (typically better than 25) with the hardness being 9 in Mohs hardness scale. It should be appreciated that the hardness necessary for the ball 50 is above 7 in the Mohs hardness scale and have a surface finish above AFBMA grade 200.

FIG. 6 shows a seat retainer 60 formed from Monel™. The seat retainer 60 is cylindrical in shape and has an external thread located around the edge of the seat retainer 60. The seat retainer is hollow and has a hexagonal recess 61 located in the top of the seat retainer 60.

FIG. 7 and FIG. 7A shows a ball retainer 70 made from Monel™. The ball retainer 70 includes a head 71 having a rearwardly extending boss 72. A semi-spherical cup 73 is located within the head and has a diameter commensurate with respect to the ball 50. Three flutes 74 extend longitudinally through the head 71 and boss 72. It should be appreciated that the number of flutes 74 may be varied in accordance with oxygen flow requirements.

FIG. 8 shows the spring 80 in further detail. The spring 80 is a helical spring and is made from Nickel 200™. The wire that is used to produce the spring has a gauge of 0.8 millimeters. The spring 80 can be tensioned as desired depending on the required break pressure or cracking pressure. The most desirable cracking pressure is between 20 to 30 psi.

FIG. 9 shows a spring retainer 90 made from Monel™. The spring retainer 90 is cylindrical in shape and has an external thread. The spring retainer 90 also includes an outwardly extending boss 91. A square aperture 92 extends through the spring retainer 90.

FIG. 10 shows a lock device 190 that again is made from Monel™. The lock device is cylindrical in shape and has an external thread. A square aperture 101 extends through the lock device.

FIGS. 11 and 12 show a dust cap 110 and a dust cap plug 120 respectively. The dust cap plug 120 fits within the dust cap 110. The dust cap 110 includes an internal thread 111 so that the dust cap 110 can be screwed on to the inlet stem 24 This causes the dust cap plug 120 to cover the inlet 24. It should appreciated that the dust cap 110 and dust cap plug 120 can be of varying configurations and are not essential to the operation of the valve 10.

Figure 13:
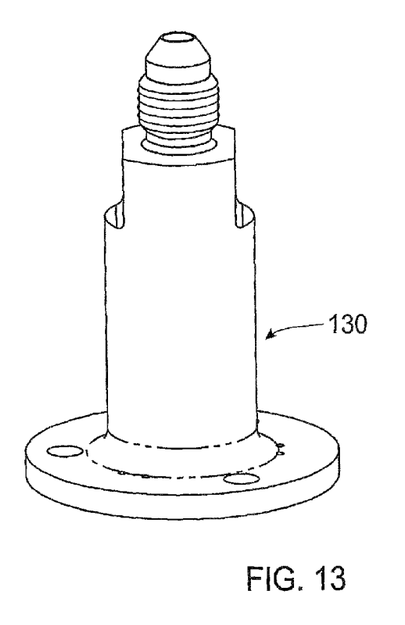
FIG. 13 shows a perspective view of a housing.

FIG. 13 shows a housing 130 made from brass. The housing includes a housing member 131 having a depending flange 132. An internal thread extends within the housing member 131. A bore 133 extends through the housing body to allow oxygen that passes from the outlet 23 to flow to an accompanying device such as an oxygen storage cylinder (not shown). It should be appreciated that the housing 130 is not essential to the operation of the valve 10, especially when the valve 10 is to be used in and in line high pressure oxygen system.

In order to assemble the flow control valve 10, the filter 30 is dropped into the passageway 21 via the outlet 23. The filter 30 sits within the passageway 21 so that the depending skirt abuts the lip 27 within the passageway 21. The seat 40 is then dropped into the passageway 21 via the outlet 23 ensuring that the groove 44 located on the front face 43 of the seat 40 faces upwardly. The seat 40 sits on the support 28 located within the passageway 21. The seat retainer 60 is then screwed into the passageway 21 with the external thread of the seat retainer 60 engaging the internal thread of the outlet stem 25. A standard tool, such as an Allan key, is placed within the hexagonal recess to screw the seat retainer 60 into the passageway 21.

The next step in assembly of the flow control valve 60 is to locate the boss 74 of the ball retainer 70 with the helical spring. The ball 50 is then placed within the semi-spherical cup. The ball 50, ball retainer 70 and spring 80 are then placed into the passageway 21 until the ball 50 abuts against the hole 41 located within the seat 40.

A spring retainer 90 is then placed within the passageway 21 and screwed into the passageway via its external thread mating within the internal thread of the outlet stem 23. The square aperture 92 of the spring retainer 90 is used for placement of a specialized square tool. The spring retainer is screwed to a desired tension based on a required cracking pressure of the flow control valve 10. Further, the spring retainer is screwed until the spring 80 is compressed to just before its maximum compression so that the ball 50 and the ball retainer 70 is only able to move approximately 0.5 millimeters during opening and closing of the valve 10. The boss 91, located on the spring retainer 90, locates within the spring 80. A lock device 100 is then screwed into the passageway 21 via the external thread of the lock device mating with the internal thread of the outlet stem 25. The lock device 100 is screwed within the passageway 21 until it contacts the spring retainer 90 to hold the spring retainer 90 in a desired location.

The outlet stem 25 of the body 20 is then screwed into the housing 130 via the internal thread of the housing 130. The body 20 is screwed into the housing 130 until the hexagonal head 26 abuts against the housing 130 to ensure the sealing of the body 20 with respect to the housing 130. A dust cap 120 is then screwed on to the inlet stem via the threads of both the dust cap and the inlet stem, until the dust cap lug 120 covers the inlet 22.

In use, the dust cap 110 and dust cap plug 120 are removed from the inlet stem 24. An oxygen supply (not shown) is then connected to the inlet stem 24 and oxygen is fed through from the inlet 22 into the passageway 21. High pressure oxygen passes through the filter 30 until there is sufficient pressure to force the ball 50 and ball retainer 70 against the spring 80 toward the outlet 23. During opening of the valve, the spring 80 is full compressed to allow oxygen to pass through the hole 41 in the seat 40 and through the flutes 74 located within the ball retainer 70. Oxygen is then able to pass through the spring retainer 130 and lock device 100 through the outlet 23 and through the respective bore in the housing 130.

The above valve provides a valve that can operate with low or zero leak rates for an extended period of service in an oxygen system. Further, as the there are no "soft" seals (non-metallics) located within the valve and the elements of the valve will not support burning in their use environment, the likelihood of the valve igniting or burning is extremely low. Further, its ability to ignite adjacent components or materials or surroundings is extremely low providing an additional level of safety.

The valve provides a safe alternative to currently available products whilst offering improved functionality and performance in many situations. The principle of the valve's operation can be applied to various different checking devices for use in oxygen-enriched atmospheres such as, but not limited to, in line flow control valves, pressure relief valves, flame arrestors, manifold flow control valves, excess flow control valves and ball valves.

It should be appreciated that various other changes and/or modification can be made to the embodiment described without departing from the spirit or scope of the invention.

The invention claimed is:

1. A flow control valve to regulate the flow of an oxygen enriched stream, the flow control valve comprising:
   a body made of a metallic material of a type that does not support burning in an oxygen enriched stream, said body having an inlet and a substantially in line outlet to receive and transmit the oxygen enriched stream;
   a seat made of a non resilient metallic material of the type that does not support burning in an oxygen enriched stream, said seat being located within the body for passage of said oxygen enriched stream thereby;
   a ball made of a metallic material of the type that does not support burning in an oxygen enriched stream, said ball being sized to sealingly seat against said seat, said ball having a surface finish of AFBMA (Anti-Friction Bearing Manufacturers Association) Grade 200 and under;
   a ball retainer made of a metallic material of the type that does not support burning in an oxygen enriched stream, said ball retainer being located within the body and positioned to capture the ball;
   a biasing means made of a metallic material of the type that does not support burning in an oxygen enriched stream, said biasing means being positioned and configured to urge said ball retainer and in turn said ball between a flow position in which the oxygen enriched stream is flowing from said inlet to said outlet and a non-flow position in which the flow of the oxygen enriched stream is impeded; and
   wherein the flow control valve is assembled without any other materials that support burning in an oxygen enriched stream positioned for contact with said oxygen enriched stream.

2. The flow control valve of claim 1 further including a seat retainer positioned to hold the seat in the body.

3. The flow control valve of claim 1 wherein at least the body, the seat, the ball retainer and biasing member are all made from a nickel based alloy or copper based alloy.

4. The flow control valve of claim 1 wherein the ball is made from corundum.

5. The flow control valve of claim 1 wherein the ball is made from aluminum oxide.

6. The flow control valve of claim 1 wherein the hardness of the ball is above 7 on Mohs hardness scale.

7. The flow control valve of claim 1 wherein the hardness of the ball is above 9 on Mohs hardness scale.

8. The flow control valve of claim 1 wherein the surface finish of the ball is less than AFBMA Grade 100.

9. The flow control valve of claim 1 wherein the surface finish of the ball is less than AFBMA Grade 50.

10. The flow control valve of claim 1 wherein the biasing means is a helical spring.

11. The flow control valve of claim 10 wherein the spring is made from wire that has a gauge of less than 1 millimeter.

12. The flow control valve of claim 10 wherein the spring is made from wire that has a gauge of less than 0.5 millimeters.

13. The flow control valve of claim 10 wherein the spring is sized to be fully compressed when the valve is opened.

14. The flow control valve of claim 10 wherein the spring prevents the ball retainer from moving more than 4 millimeters.

15. The flow control valve of claim 10 wherein the spring prevents the ball retainer from moving more than 2 millimeters.

16. The flow control valve of claim 10 further including a spring retainer positioned to hold and guide the spring within the body.

17. The flow control valve of claim 16 wherein a threshold pressure of the oxygen enriched stream that the body, seat, ball retainer and spring retainer are made to hold is greater than 25 MPA.

18. The flow control valve of claim 16 wherein a threshold pressure of the oxygen enriched stream that the body, seat, ball retainer and spring retainer are made to hold is greater than 40 MPA.

19. The flow control valve of claim 16 further including a lock device positioned to hold the spring retainer in a desired position within the body.

20. The flow control valve of claim 1 further including a filter located within the body adjacent the seat.

21. The flow control valve of claim 20, wherein the filter has a conical section.

22. The flow control valve of claim 21, wherein the conical section of the filter has a depending skirt.

23. The flow control valve of claim 20, wherein the filter is made of sintered bronze.

24. The flow control valve of claim 1 wherein said body has an internal passageway which is threaded.

25. The flow control valve of claim 1 wherein the valve has a cracking pressure of less than 50 psi.

26. The flow control valve of claim 1 wherein the valve has a cracking pressure of less than 40 psi.

27. The flow control valve of claim 1 wherein the valve has a cracking pressure of less than 30 psi.

28. The flow control valve of claim 1, wherein the ball retainer has one or more flutes.

\* \* \* \* \*